US006990585B2

(12) United States Patent
Maruyama et al.

(10) Patent No.: US 6,990,585 B2
(45) Date of Patent: Jan. 24, 2006

(54) DIGITAL SIGNATURE SYSTEM, DIGITAL SIGNATURE METHOD, DIGITAL SIGNATURE MEDIATION METHOD, DIGITAL SIGNATURE MEDIATION SYSTEM, INFORMATION TERMINAL AND STORAGE MEDIUM

(75) Inventors: Hiroshi Maruyama, Tokyo (JP); Michiharu Kudoh, Kamakura (JP); Kento Tamura, Machida (JP)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 09/930,349

(22) Filed: Aug. 15, 2001

(65) Prior Publication Data

US 2002/0049906 A1 Apr. 25, 2002

(30) Foreign Application Priority Data

Aug. 31, 2000 (JP) ..................... 2000-262955

(51) Int. Cl.
*H04L 9/00* (2006.01)

(52) U.S. Cl. .................. 713/176; 713/180; 705/75; 705/78; 705/79

(58) Field of Classification Search ............. 713/155, 713/176, 180–181, 201; 705/26, 75, 77–79
See application file for complete search history.

(56) References Cited

U.S. PATENT DOCUMENTS 5,671,279 A * 9/1997 Elgamal ................. 705/79
5,903,878 A * 5/1999 Talati et al. ............. 705/26
6,003,015 A * 12/1999 Kang et al. .............. 705/15
6,039,248 A * 3/2000 Park et al. ............... 235/379
6,085,322 A * 7/2000 Romney et al. ........... 713/176
6,671,805 B1 * 12/2003 Brown et al. ............. 713/176
6,704,736 B1 * 3/2004 Rys et al. ................ 707/100
2002/0112009 A1 * 8/2002 Capers et al. ............. 709/206
2003/0046317 A1 * 3/2003 Cseri et al. .............. 707/513
2004/0181756 A1 * 9/2004 Berringer et al. .......... 715/530

FOREIGN PATENT DOCUMENTS

| JP | 03-026126 | 2/1991 |
| JP | 10-083138 | 3/1998 |
| WO | WO 99/08415 | 2/1999 |

OTHER PUBLICATIONS

XML–Signature Core Syntax, Oct. 20, 1999, W3C.*
WMLScript Crypto Library, Nov. 5, 1999, Wireless Application Forum, pp. 2–17.*

* cited by examiner

*Primary Examiner*—Gilberto Barron, Jr.
*Assistant Examiner*—Minh Dinh
(74) *Attorney, Agent, or Firm*—Louis P. Herzberg

(57) ABSTRACT

The present invention provides digital signature techniques using an information terminal, such as a portable terminal, having limited calculation resources. In one embodiment, a signature demandant generates a document to be signed, and an agent receives this document. The agent generates summary text for this document, and transmits the summary text to a signatory, and the signatory displays the summary text using his or her information terminal. The signatory confirms the contents, employs a private key stored in his or her terminal to sign (encrypt) the summary text. The signatory thereafter transmits a signature value to the agent, who generates a signed document that includes the signature value. Finally, the signature demandant verifies (decrypts) the received signed document using the public key of the signatory and confirms the contents.

36 Claims, 6 Drawing Sheets

Fig. 3

```
1    <?xml version="1.0" encoding="UTF-8"?>
2    <Invoice>
3      <bookorder>
4        <item>
5          <title>XML and Java</title>
6          <ISBN>0201485435</ISBN>
7          <quantity>1</quantity>
8          <price>39.95</price>
9        </item>
10     </bookorder>
11     <payment>
12       <payTo>AAAAA.com, Inc.</payTo>
13       <billedTo>Hiroshi Maruyama</billedTo>
14       <amount unit="USD">39.95</amount>
15       <dueDate>Apr., 3, 2000</dueDate>
16       <paymentMethod>
17         <creditCard>
18           <cardType>MasterCard</cardType>
19           <cardHolderName>Hiroshi Maruyama</cardHolderName>
20           <expirationDate>04/2001</expirationDate>
21           <cardNumber>5283 8304 6232 0010</cardNumber>
22         </creditCard>
23       </paymentMethod>
24     </payment>
25   </Invoice>
```

Fig. 4

```
1    I, Hiroshi Maruyama, will pay 39.95 USD
2    to AAAAA.com, Inc. by Apr., 3, 2000
3    for the purchase of 1 QTY of book titled
4    XML and Java.
```

Fig. 5

```
1   <n1:SignedInfo xmlns:n1="http://www.w3.org/2000/01/xmldsig/">
2     <n1:CanonicalizationMethod xmlns:n1="http://www.w3.org/2000/01/xmldsig/"
3       Algorithm="http://www.w3.org/TR/1999/WD-xml-c14n-19991115"></n1:CanonicalizationMethod>
4     <n1:SignatureMethod xmlns:n1="http://www.w3.org/2000/01/xmldsig/"
5       Algorithm="http://www.w3.org/2000/01/xmldsig/dsa"></n1:SignatureMethod>
6     <n1:Reference xmlns:n1="http://www.w3.org/2000/01/xmldsig/"
7       URI="%document to be signed URI%">
8       <n1:Transforms xmlns:n1="http://www.w3.org/2000/01/xmldsig/">
9         <n1:Transform xmlns:n1="http://www.w3.org/2000/01/xmldsig/"
10          Algorithm="http://www.w3.org/TR/1999/PR-xpath-19991008">
11          concat("I, ", /Invoice/payment/billedTo, ", will pay ", /Invoice/payment/amount, " "
12            /Invoice/payment/amount/@unit, " to ", /Invoice/payment/payTo, " by ",
13            /Invoice/payment/dueDate, " for the purchase of ",
14            /Invoice/bookorder/item/quantity, " QTY of book titled ",
15            /Invoice/bookorder/item/title, ".")
16        </n1:Transform>
17        <n1:Transform xmlns:n1="http://www.w3.org/2000/01/xmldsig/"
18          Algorithm="http://www.w3.org/TR/1999/WD-xml-c14n-19991115"></n1:Transform>
19      </n1:Transforms>
20      <n1:DigestMethod xmlns:n1="http://www.w3.org/2000/01/xmldsig/"
21        Algorithm="http://www.w3.org/2000/01/xmldsig/sha1"></n1:DigestMethod>
22      <n1:DigestValue xmlns:n1="http://www.w3.org/2000/01/xmldsig/"
23        Encoding="http://www.w3.org/2000/01/xmldsig/base64">
24        %digest value of the summary text %
25      </n1:DigestValue>
26    </n1:Reference>
27  </n1:SignedInfo>
```

Fig. 6

```
1   <?xml version="1.0" encoding="UTF-8"?>
2   <Signature xmlns="http://www.w3.org/2000/01/xmldsig/">
3     <SignedInfo>
4       <CanonicalizationMethod Algorithm="http://www.w3.org/TR/1999/WD-xml-c14n-19991115"/>
5       <SignatureMethod Algorithm="http://www.w3.org/2000/01/xmldsig/dsa"/>
6       <Reference URI="http://www.myagent.com/myorder/2000/0321.xml">
7         <Transforms>
8           <Transform Algorithm="http://www.w3.org/TR/1999/PR-xpath-19991008">
9             concat(" L ", /Invoice/payment/billedTo, ", will pay ", /Invoice/payment/amount, " "
10            /Invoice/payment/amount/@unit, " to ", /Invoice/payment/payTo, " by ",
11            /Invoice/payment/dueDate, " for the purchase of ",
12            /Invoice/bookorder/item/quantity, " QTY of book titled ",
13            /Invoice/bookorder/item/title, " ")
14          </Transform>
15          <Transform Algorithm="http://www.w3.org/TR/1999/WD-xml-c14n-19991115"/>
16        </Transforms>
17        <DigestMethod Algorithm="http://www.w3.org/2000/01/xmldsig/sha1"/>
18        <DigestValue Encoding="http://www.w3.org/2000/01/xmldsig/base64">
19          KnkofqqssCINIew59DrhE6Hnrpk=
20        </DigestValue>
21      </Reference>
22    </SignedInfo>
23    <SignatureValue>
24      MCwCFBvOeJygByRVVHjM0YJ47qfkoDITAhRr9u9OcIGcXrKzOuNIRJiQTYGRhw==
25    </SignatureValue>
26    <KeyInfo>
27      <X509Data>
28        <X509Name>CN=Hiroshi Maruyama, OU=TRL, O=IBM, C=JP</X509Name>
29        <X509Certificate>
30          MIICvTCCAnsCBChZhc4wCwYHKoZIzjgEAwUAMEQxCzAJBgNVBAYTAkpQMQwwCgYDVQQKEwNJQk
31          0xDDAKBgNVBAsTA1RSTDEZMBcGA1UEAxMQSGlyb3NoaSBNYXJ1eWFtYTAeFw05OTEyMTcwMDM3
32          MzRaFw0wMDAzMTYwMDM3MzRaMEQxCzAJBgNVBAYTAkpQMQwwCgYDVQQKEwNJQkOxDDAKBgN
33          VBAsTA1RSTDEZMBcGA1UEAxMQSGlyb3NhSBNYXJ1eWFtYTCCAbgwggEsBgcqhkjOOAQBMIIBHwK
34          BgQD9f1OBHXUSKVLFSpwu7OTn9hG3UjzvRADDHj+AtlEmaUVdQCJR+1k9jVj8v8X1ujO2y5tVbN6BO4A
35          dNG/yZmC3a5lQpaSfn+gEaxAiwk+7qdf+t3Yb+DtX58aophUPBPuD9tPFHsMCNVQTWhaRMvZ1864rYdcq
36          7/LAxmdOUgBxwIVAJdgUl8VIwvMspK5gqLrhAvwWBz1AoGBAPfhoIXWmz3ey7yrXDa4V7l5IK+7+jrqgvIXT
37          As9B4JnUVIXjrrUWU/mcQcQgYCOSRZxJ+hMKBYTt88JMozipuE8FnqLVHyNKOCjrh4rs8Z1kW6jfwv6ITVi
38          8ftiezEkO8yk8b6oUZCJqIPF4VrInwaSi2ZegHtVJWQ5TDv+z0kqA4GFAAKBgQCE12KsJ2zPP0F+VuR4xGJ
39          Q23ogU47HmOY4TEGrlJCuYE9xjqo+Oh/7PtnKj/9+OmSNH1HDIY4GYh3KnjfwB7+2BmAwVLBOkkYZwdc
40          zb5aok7pj7UQllRgOp2b/O8Fq4ZBDA483SrVwiCvuT3STGQykEyPw4wtkXgipwQb+NDfKUqCzALBgcqhkjO
41          OAQDBQADLwAwLAlUZeGr8xv9/LwgNBFbr9tkSq2wy5QCFHJOnTNQgisZOl61+O2ycivpOXHE
42        </X509Certificate>
43      </X509Data>
44    </KeyInfo>
45  </Signature>
```

Fig. 7

DIGITAL SIGNATURE SYSTEM, DIGITAL SIGNATURE METHOD, DIGITAL SIGNATURE MEDIATION METHOD, DIGITAL SIGNATURE MEDIATION SYSTEM, INFORMATION TERMINAL AND STORAGE MEDIUM

FIELD OF THE INVENTION

The present invention relates to a digital signature method and a system therefor. In particular, the present invention relates to an effective technique applied when a document to be signed is an XML document, and when digital signature is performed using a portable device such as a PDA (Personal Digital Assistants) or a portable telephone compatible with i-mode communication.

BACKGROUND ART

As network electronic data techniques have developed, there has been an accompanying shift away from paper as information transmission media to the electronic data themselves. Generally, when paper is the medium used, the signing or the affixing of a seal is performed as a personal confirmation of the contents (information) recorded on the paper. However, since electronic data are easily copied and during the communication process there are many opportunities for the alteration of data, an indispensable need exists for a digital signature technique that affords high security.

Public key cryptography (also called asymmetric cryptography) and secret key cryptography (also called symmetric cryptography) are well known data cryptography methods. According to secret key cryptography, a sender and a recipient who engage in secure communication each hold a shared key. When communicating with the recipient, the sender uses the shared key to encrypt information, and upon receiving the encrypted information, the recipient uses the shared key to decrypt it. As an assumption when this method is employed, the shared key is a secret that is jointly shared by the sender and the recipient, and if the secret, the shared key, is compromised, encrypted communications for which the shared key is used will not be secure.

On the other hand, according to the public key cryptography, a pair of keys, a public key and a private key, are employed, and information encrypted using one key can not substantially be decrypted unless the other key is used. A user encrypts information using the public key of another user that has been obtained in advance, and transmits the encrypted information to the subject user. Thereafter, the recipient decrypts the received information using his or her private key. The advantage of this method is that communication security can be maintained even when the public key has been disclosed to third parties, and no secret key information need be shared as a communication prerequisite. A digital signature can also be affixed using this public key cryptography. That is, a sender, using a private key that only he or she has knowledge of, can encrypt a document, and a recipient can obtain a public key corresponding to the private key and use it to decrypt the document. As a result, the contents of the signed document can be confirmed. In this case, satisfactory grounds must be established to confirm that the disclosed public key belongs to the signing person. For this confirmation, a certification service provided by a certification authority (CA) can be employed. For the user, it is important that he or she be able to protect his or her private key. If the private key should be exposed, a third party could employ the private key to impersonate the actual owner of the key. Therefore, for the security of a digital signature (both for communication cryptography and key distribution) it is imperative that absolute protection be afforded a private key.

For recent electronic commerce (e-business), XML documents have been employed as the form used for the exchange of data. Since an XML document is a self-descriptive structure, more complicated data can be handled effectively. Therefore, it is highly possible that XML will be employed as a standard not only for B2B (business to business) documents, but also B2C (business to consumer) documents.

Because of this background, digital signature specifications for XML, XMLDSIG, are being established for the WWW Consortium, W3C. The XML digital signature technique is expected to be used as a trump card for the prevention of data alteration and the acquisition of evidence to support a transaction.

Problems to be Solved by the Invention

As is described above, the protection of a private key is important in order to prove the identity of an authenticated user, or to prevent a third party from impersonating the authenticated user. Thus, it is not secure for a private key to be stored and managed on the hard disk of a personal computer; it is advantageous that the private key be stored on a security token, such as a smart card, that a user can remove and carry.

However, since a smart card does not have a display function, the user must employ a personal computer having a card reader to confirm, on its screen, the contents of a document to be signed. When, for example, a user purchases a product at a shop and signs a transaction document for electronic payment, the user confirms the contents of the document on the screen of a local personal computer or the POS terminal at the shop. At this time, a question exists relative to the validity of the contents of the displayed document. In this case, if the contents of the document transmitted by a transaction organization to the terminal were altered before transmission, this alteration would not be apparent to the user, who would sign a document including terms differing from those previously agreed upon. To remove this uncertainty, it is advantageous that the user employ a fully secure terminal, e.g., his or her own PDA or i-mode portable telephone, to confirm a document to be signed.

However, the following problem has arisen relative to the mounting of a digital signature function on a terminal. This is an outstanding problem, especially when a portable terminal is used to perform the XML digital signature function, which in the future will be further developed. Since a portable terminal has only a small display screen, it is difficult to display complete sentences contained in a document that is to be signed. Especially for an XML document, the display screen of a portable terminal is insufficiently large to display additional tag information and other information based on DSIG specifications.

Further, the calculation resources available to a portable terminal are generally limited, and this, imposes an exceedingly large load on the portable terminal when calculations required for an electric signature are to be performed. Since especially for an XML digital signature an XML or an XPath processor is required, if such a processor is mounted on a portable terminal having only limited calculation resources, costs will be increased.

SUMMARY OF THE INVENTION

It is, therefore, one aspect of the present invention to provide XML digital signature technique and systems for using an information terminal, such as a portable telephone, having limited calculation resources.

It is another aspect of the present invention to provide a more secure digital signature method and system, or a terminal for digital signatures.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 6 is a list showing a signature template; and

FIG. 7 is a list showing an example signed document that is generated.

DESCRIPTION OF THE SYMBOLS

1: Internet
2: Signature demandant system
3: Agent system (agent)
4: User terminal
5: Internet service provider (ISP)

DETAILED DESCRIPTION OF THE INVENTION

According to an example of a digital signature method of this invention, an agent acts for a signatory by receiving a document, such as an XML document, to be signed, and generates summary text of the document. The agent then transmits the summary text to the signatory, who displays it on his or her information terminal and confirms its contents. After confirming the contents, the signatory signs (encrypts) the summary text, using the private key stored in his or her terminal. Thereafter, the signatory transmits the signature value (encrypted data) to the agent, who generates a signed document, including the signature value, and transmits this to a signature demandant. Finally, the signature demandant verifies (decrypts) the received signed document using the public key of the signatory and confirms the contents.

According to this signature method, the user (signatory) can display summary text that has been converted into a form (e.g., text form) that is appropriate for a display terminal, and can confirm the contents of a document. Furthermore, the calculation load, such as the use of the XML processor, is not imposed on the user for the cryptography of summary text, and even a device, such as a portable terminal, having limited calculation resources can satisfactorily encrypt summary text. Since the user employs his or her own terminal, the validity of the displayed data is unquestionable, and since the private key is stored in the user's own terminal, the security of the private key can be fully maintained. As a result, a secure digital signature method can be provided, according to which a signatory is responsible for the contents of the summary text, while for the contents of a document to be signed that are not included in summary text, the agent and the user (signatory) share responsibility within a range agreed upon by the agent and the user. The summary text is generated by employing, for example, the XPath of an XML document, and for extracting the contents (character string) of the XML element. XML digital signature permits the usage of the XPath, and the thus prepared document, bearing an XML digital signature, will conform to the standards established for XML digital signature.

For signing summary text, a hash value (digest value) is often generated using a function, such as a unidirectional hash function, that is employed to generate for input data a uniquely representative value that is difficult to use for the regeneration of the data. Then, the document, including the digest value, can be encrypted using the private key in the terminal. Additionally, a signature template, which includes a variable field to which the hash value (digest value) of the summary text is added, can be stored in the terminal. To obtain a signature value, a hash conversion can be performed for the signature template and the obtained hash value then encrypted. The URI of the document to be signed (digital document) can also be added to the signature template.

By using the above signature template, a signature process that conforms to the XML digital signature standards can be performed, without mounting the XML processor or the XPath processor on a terminal. That is, a signature template can be prepared in advance using a form that conforms to the XML digital signature standards, and can be recorded in the terminal. Then, for an XML signed document, a required signature value can be generated that is later added to an XML signed document that is generated by an agent. In other words, the terminal need only perform the generation of a hash value for summary text, the adding of the hash value to the template (and the adding of the URI), the generation of a hash value for the template and the cryptography of the hash value. A function, such as is supplied by the XML processor, is not required.

In some embodiments, the signature template is canonicalized (normalized) using a predetermined algorithm. Thus, fluctuations in a document, such as blanks or symbols, can be standardized.

An advantageous embodiment of the present invention will now be described in detail while referring to the accompanying drawings. It should be noted, however, that the present invention is not limited to this embodiment, and that it can be implemented with various different embodiments. The same reference numerals are used throughout to denote corresponding or identical components.

For this embodiment, the explanation given will be mainly for the method or the system of the invention; however, as will be apparent to one having ordinary skill in the art, the present invention can be provided not only as a method and a system but also as a storage medium on which a computer-readable program can be stored. Therefore, the present invention can be implemented as hardware or software, or as a combination of the two. An example storage medium on which the program can be recorded is an arbitrary computer-readable storage medium, such as a hard disk, a CD-ROM, an optical storage device or a magnetic storage device.

Further, in this embodiment, a common computer system can be employed. The computer system used for this embodiment comprises a central processing unit (CPU), a main memory (RAM) and a nonvolatile memory (ROM), all of which are interconnected by a bus. In addition, a co-processor, an image accelerator, a cache memory and an input/output controller (I/O) may be connected to the bus. Further, an external storage device, a data input device, a display device and a communication controller are connected to the bus via an appropriate interface. Furthermore, this computer system can also include a hardware resource with which a computer system is generally equipped. An example external storage device can be a hard disk drive; however, the external storage device is not thereby limited, and may include a magneto-optical storage device, an optical storage device, or a semiconductor storage device, such as a flash memory. The data input device can be an input device, including a keyboard, or a pointing device, such as a mouse. The data input device can also include an image reader, such as a scanner, or a voice input device. An example display device can be a CRT, a liquid crystal display device or a plasma display device. Further, the computer system can be an arbitrary type of computer, such as a personal computer, a workstation or a main frame computer.

Figure 1:
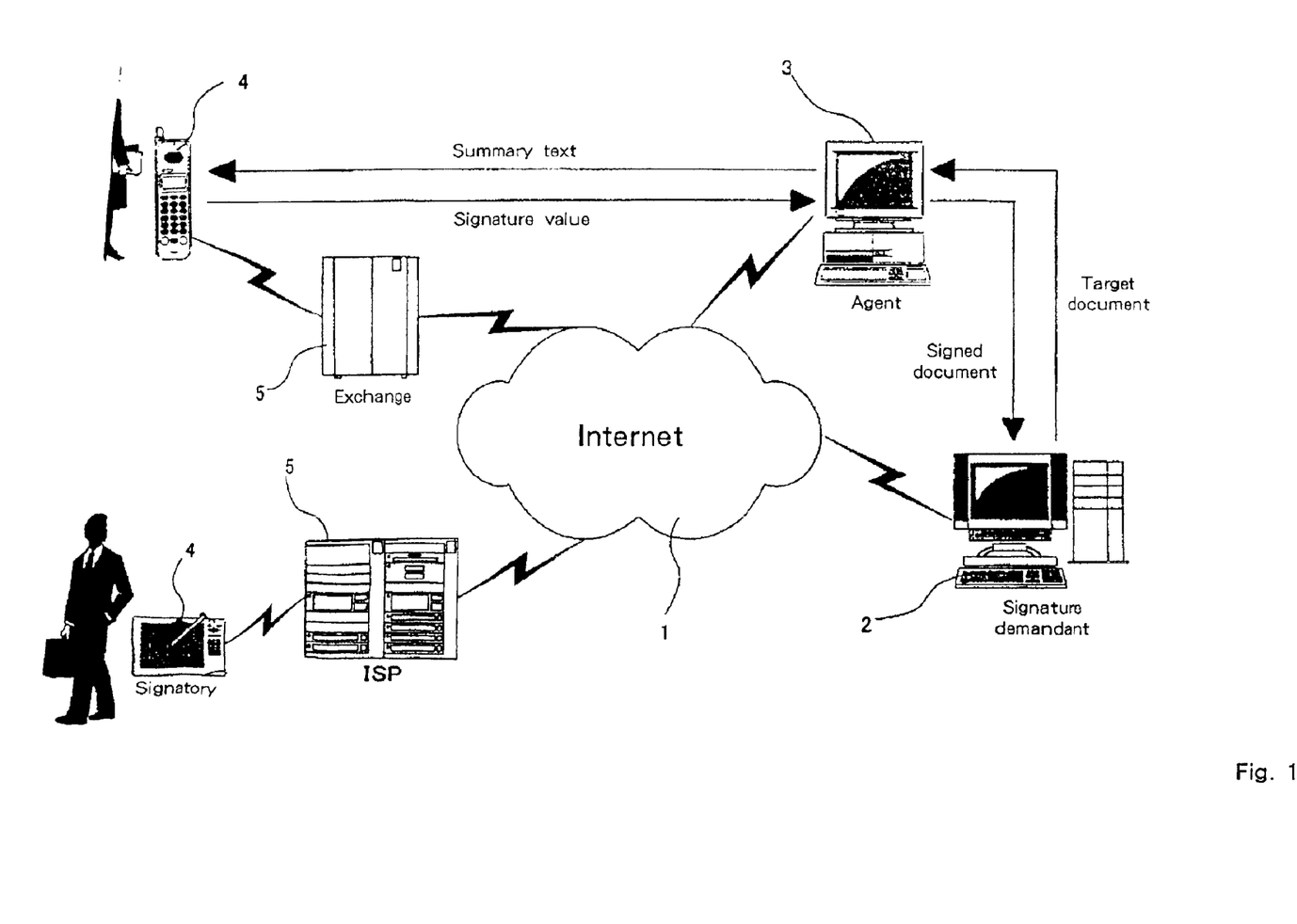
FIG. 1 is a block diagram showing an example digital signature system according to the present invention.

FIG. 1 is a block diagram showing an example digital signature system according to the invention. The digital signature system of this embodiment comprises a signature demandant system 2, an agent system 3 and a user (signatory) terminal 4, all of which are connected to the Internet 1. In this embodiment, the Internet 1 is employed; however, the signature demandant system 2, the agent system 3 and the user terminal 4 may be connected by a wired or wireless private network. Further, instead of the Internet 1, a private intranet that only a specific users can access may be employed. So long as the systems and the terminal can be interconnected by some communication means, such a configuration is included in the present invention. The signature demandant system 2, which is a system for a person who requests a signature, issues a document to be signed. The document to be signed is an XML document, as will be described in detail later. As is described above, general computer system can be used for the signature demandant system 2. The signature demandant system 2 is, for example, an electronic commerce site (EC site). As will be described later, this invention can be employed for a case wherein a signature is requested for an order slip upon the sale of a product (a book in this embodiment) through electronic commerce. For the security of electronic commerce, it is advantageous that the EC site obtain an order invoice that an orderer (user) can not deny later i.e., an order invoice bearing the signature of the orderer, and then dispatch the product. This order invoice is an electronic document, such as an XML document, and the signature is a digital signature, such as an XML digital signature. This invention can improve the security and safety of electronic commerce transactions and can contribute to the formation of a suitable transaction order. The use of the digital signature system of this embodiment is not limited to an EC site. So long as the system of this invention can provide evidence to prevent a signatory from denying a transaction later, this system is available. The system can be used, for example, for a case wherein an in-house document exchanged via the Internet or an intranet is approved. That is, signature demandant can include not only an EC site, but also any other signature demandant, such as a person who has an in-house approval right or a contract partner. The agent system 3 is a system used by an agent. The agent is a third party who mediates an agreement between a signature demandant and a signatory, and who is reliable representative for of both of them. The agent system 3 generates summary text from a document to be signed. Then, as will be described later, to obtain a signed document, the agent system 3 adds a signature value generated by the terminal 4 to a requested document. In other words, the agent system 3 requests that a user (signatory) provide a signature only for the summary text of a document to be signed, and employs the signature value to generate a signed document requested by a signature demandant. The summary text is a document obtained by conversion, so that even the user terminal 4 can display the main contents of the document to be signed. Since the document is converted into summary text by an agent, the terminal 4 need only display the summary text; it does not have to display all the XML document. Thus, it is easy for a document to be displayed, even when the terminal 4 is a device, such as a PDA or a portable telephone, having a small display screen. Furthermore, the user terminal 4 encrypts summary text, and basically does not have to handle an XML document. That is, the agent system 3 requests that a user provide a signature for summary text that constitutes the substantial portion of a contract (promise), and processes the formal portion for matching the XML. Therefore, an XML processor, for example, need not be mounted on a user terminal 4, and the calculation load can be reduced costs lowered. The user terminal 4 is an information terminal for a user, and can be, for example, a PDA or an i-mode portable telephone. The user terminal 4 has a small display screen, and stores the private key of the user. Since the user records his or her private key on his or her own terminal, the private key can be fully protected. For digital signature using the terminal 4, the summary text can be displayed on the screen of that terminal, so that the user can trust the displayed data. The signature template is also recorded in the user terminal 4. The function of the signature template will be described later.

When the user terminal 4 is a portable telephone, the portable telephone is connected to the Internet 1 via an exchange 5 belonging to a carrier (a telephone provider). When the user terminal 4 is a PDA, the PDA is connected to the Internet 1 via an Internet service provider (ISP) 5. These portable terminals may be connected directly to the Internet 1 by obtaining an IP address.

In this embodiment, a portable terminal, such as a PDA or a portable telephone, is used as the user terminal 4. However, instead of this, a common computer system may be employed. It should be noted that when the present invention is applied to a portable terminal having a small display screen and limited calculation resources, the effects are magnified.

Further, in this embodiment, the agent 3 is employed as an independent system; however, the signature demandant system 2 may provide the function of the agent 3, or the carrier (telephone provider) 5 or the ISP 5 may function as the agent 3. Further, an application service provider (ASP) may include the function of the agent 3 as a part of the service it provided.

Figure 2:
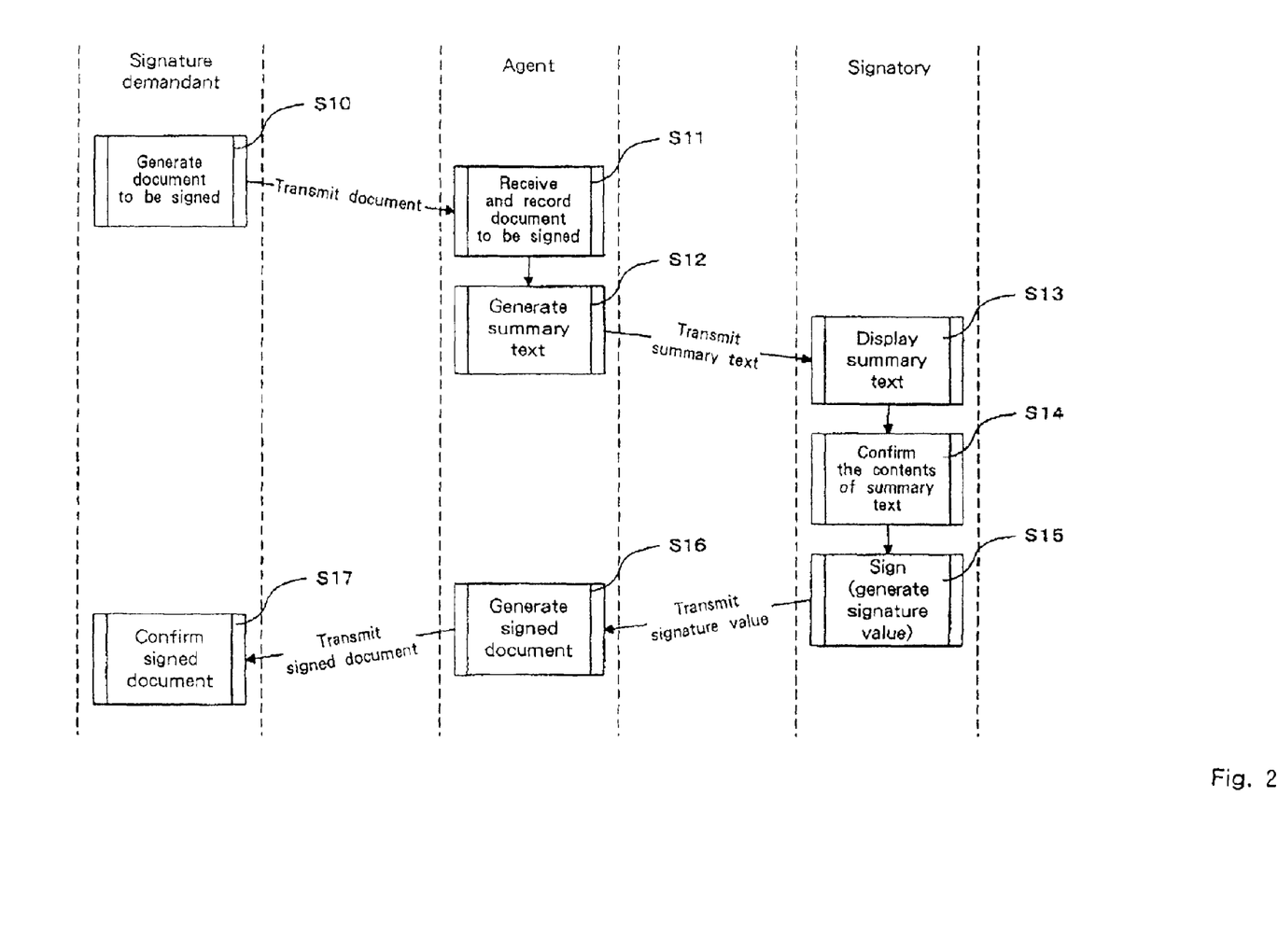
FIG. 2 is an example flowchart for a signature method according to one embodiment of the invention.
Figure 3:
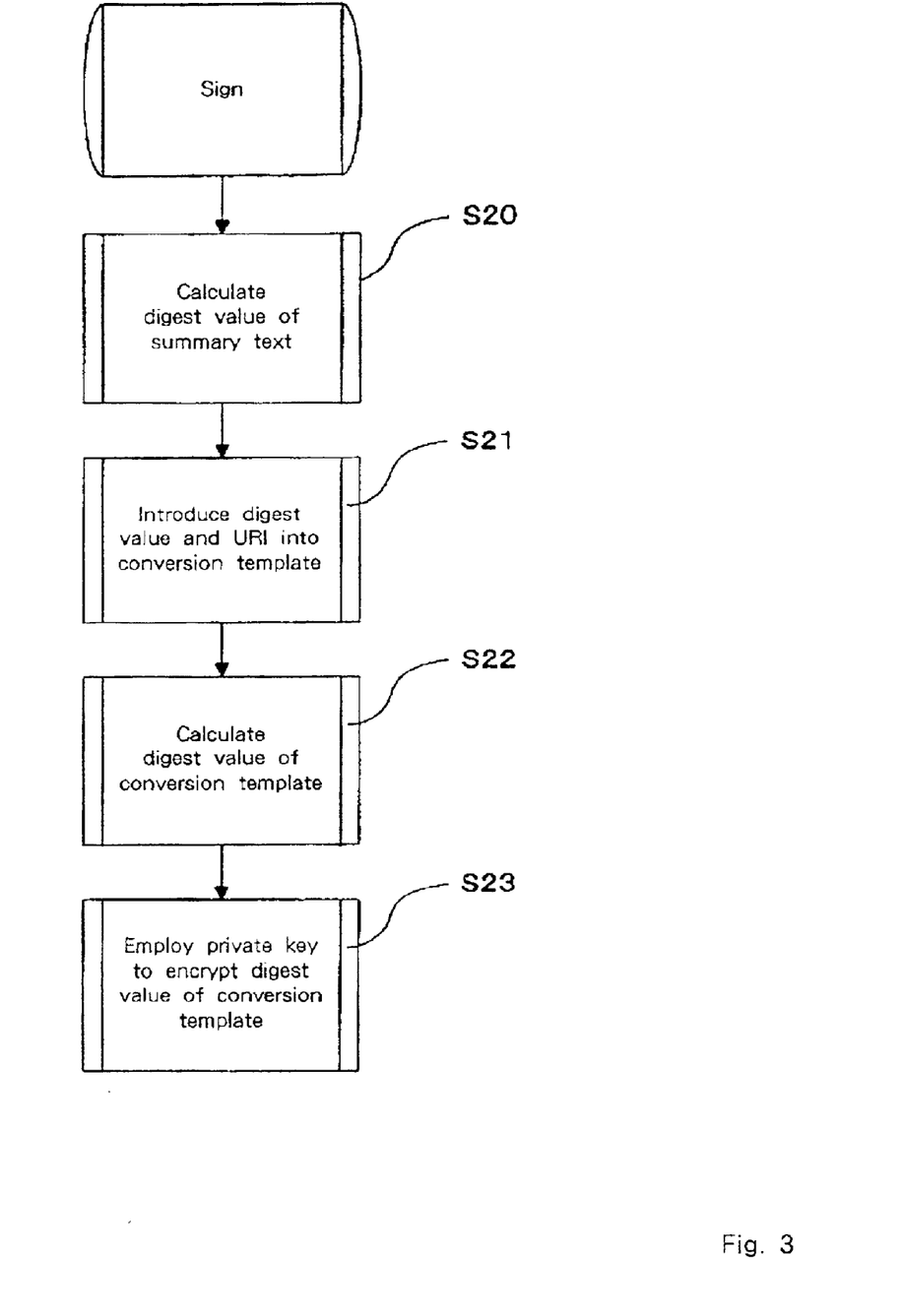
FIG. 3 is a flowchart for an example signature operation.

FIG. 2 is a flowchart showing an example signature method according to the embodiment. FIG. 3 is a detailed flowchart showing an example signed portion in FIG. 2. In FIG. 2, the process performed by the signature demandant is shown on the left, the process performed by the agent is shown in the center, and the process performed by the signatory is shown on the right.

First, the signature demandant system 2 generates a document to be signed (step S10).

Figure 4:
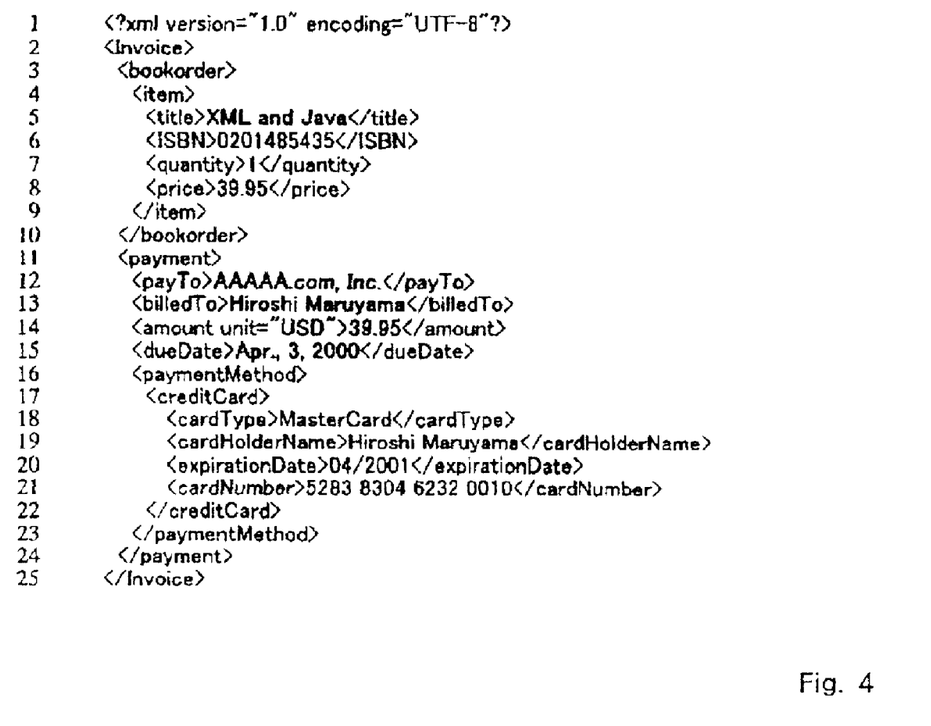
FIG. 4 is a list showing an example document to be signed.

FIG. 4 is a list showing an example document to be signed. As is shown in FIG. 4, the document to be signed is written in XML. A complicated transaction can be effectively performed by the information exchange of the XML document. It should be noted that on the list in FIG. 4, the numbers on the left are line numbers. The same thing applies to the lists in FIGS. 5 to 7. The XML document in FIG. 4 is an example book order invoice. An <invoice> tag indicates that a document is an invoice (line numbers 1 to 25), and the portion enclosed by <bookorder> tags represents the contents of a book order (line numbers 3 to 10). The title, the ISBN code, the volume and the price are written as the order contents in the portions enclosed respectively by <title> tags, <ISBN> tags, <quantity> tags and <price> tags. Further, information concerning a payment is written in the portion enclosed by <payment> tags (line numbers 11 to 24). And the payment destination, the payment source, the price, the payment due date and the payment method are written in the portions respectively enclosed by <payTo>, <billedTo>, <amount>, <dueDate> and <paymentMethod> tags. In addition, payment by card and various card data are written in (line numbers 16 to 23). It should be noted that this invoice (XML document) is merely an example.

An explanation will now be given for a case wherein a signature demandant (a book vendor in this embodiment) prepares the above invoice, and requests a confirmation signature be applied to the invoice. The signature demandant system 2 transmits the prepared document to the agent system 3, and the agent system 3 receives the document and records it (step S11).

Figure 5:
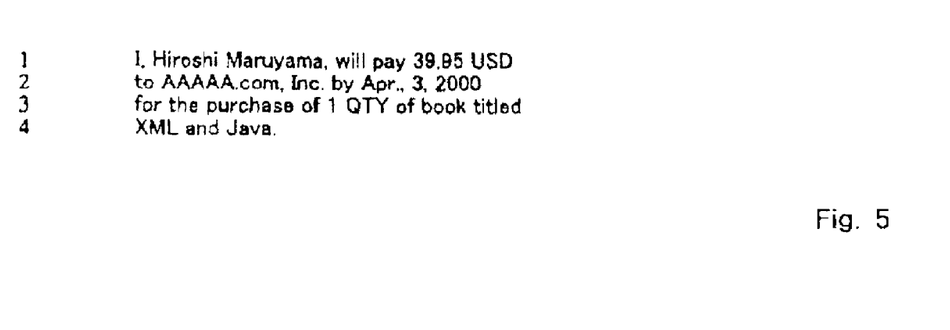
FIG. 5 is a list showing example summary text.

Using the document, the agent system 3 generates summary text to be signed (step S12). FIG. 5 is a list showing example summary text that has been generated. The XPath processor is employed to generate summary text. That is, the XPath processor is mounted at the agent system 3, and the summary text is automatically generated based on the document to be signed (invoice in FIG. 4). As is shown in FIG. 5, the summary text is a text document that includes only the essential portion for an order and payment. The agent system 3 then transmits the summary text to the user terminal 4, and the user terminal 4 displays it (step S13). As is described above, the summary text is plain text that includes only an important portion required for confirmation. Thus, even a user terminal 4 having a small screen can fully display the summary text. The user confirms the reliable contents of the summary text displayed on the screen (step S14), and signs the summary text if he or she agrees with the contents (step S15).

FIG. 3 is a flowchart for the signature process. For this process, first, the digest value of the summary text that has been confirmed is calculated (step S20). The hash function, for example, is employed for the calculation of the digest value. It should be here noted that not only the hash function, but also another function can be employed that provides a unique value to be output for the input data, and further, that it is difficult to perform an inverse conversion based on the output value. Then, the digest value and the URI for signature are introduced into the signature template (step S21). FIG. 6 is a list showing an example signature template. The signature template is generated in advance to match the document to be signed (the order invoice in FIG. 4), and conforms to the XML digital signature standards.

Variable fields are included in the signature template (line numbers 7 and 24). In this embodiment, the target URI and the digest value for the summary text are allocated to the variable fields. The digest value (hash value) of the summary text and the URI of the document to be signed are added to the variable fields. The signature template is canonicalized using a predetermined algorithm. Thus, fluctuations, such as a character code, a blank or a symbol, can be removed. Even when these slight fluctuations do not affect the contents of a document, the hash value greatly differs and interferes with the examination of the signed contents. Through canonicalization, the occurrence of this barrier can be prevented.

Following this, the digest value is calculated for the overall signature template to which the digest value of the summary text and the URI of the document are added (step S22). The hash function can also be employed for the calculation of this hash value. Thereafter, the digest value obtained for the overall signature template is encrypted by using the private key (step S23). This process sequence is the signature operation, and a value generated by the cryptography is employed as a signature value. The operations performed by the user terminal 4 are limited to the calculation of the hash values for the summary text and the template, and the cryptography using a private key. The template is a text document written using the character code (Unicode) that is designated by a predetermined canonicalization method, and the above operations are not those using the XML processor for the XML document. That is, the operations impose only a small load, so that a device having only limited resources can satisfactorily perform them. Therefore, the effects of the present invention are magnified when an information terminal such as a PDA, which possesses limited calculation resources, is employed as the user terminal 4.

Further, the operation performed by the user terminal should be performed in a manner that conforms to the XML digital signature specifications. The canonicalization method, the signature method, the transformation of the summary text and the digest method are designated in the specifications. These designated specifications are written in the signed document and the signature template. For example, in the signature template in FIG. 6, the canonicalization method is written on line numbers 2 to 3, and canonicalization according to the method must be performed. The signature method is written on line numbers 4 and 5, and the DSA is designated. Thus, at step S23 the cryptography must be performed by the DSA. Similarly, the conversion of the document to be signed into summary text must be performed according to the transformation type (line numbers 9 to 19), and the calculation of the digest value (line numbers 20 and 21) must be performed by SHA1. Since the signature template is canonicalized, it is written using the unicode (UTF-8). The user terminal 4 transmits the thus obtained signature value to the agent system 3, and in accordance with the received signature value the agent system 3 generates a signed document (step S16). FIG. 7 is a list showing an example signed document. The same information as the information (<SignedInfo>) entered in the signature template is written in the signed document, so that it matches the signature template.

"http://www.myagent.com/myorder/2000/0321.xml"
(the same value as is added to the signature template) is added to the target URI, and the digest value (line number 19) and the signature value (line 24) received from the user terminal 4 are also added. Finally, the public key information (line numbers 26 to 44) for the signatory is added to obtain a signed document. The agent system 3 transmits the signed document to the signature demandant system 2, and the signature demandant system 2 confirms the contents of the received signed document (step 17). The signature demandant decrypts the signature value (line number 24) using the public key information (line numbers 26 to 44) for the signed document. Further, at this time the signature demandant can employ the signed information (line numbers 3 to 22) to generate the summary text of a document and the digest value of the summary text, so that the hash value before cryptography can be obtained. When the decrypted hash value and the calculated hash value match, the legality of the signature can be authenticated.

According to the signature method and signature system, the XML digital signature (XMLDSIG) can be performed using an information terminal, such as a portable terminal, having limited calculation resources and a small display screen. According to the system and the method of this embodiment, since a private key is stored in a portable information terminal, the terminal can serve as one type of security token, and the security for the private key can be improved. Further, since a signatory can confirm the contents of the summary text on a reliable display screen, the reliability of the transaction can be improved.

Since the signatory provides a signature only for the summary text, he or she is responsible only for the signed summary text. In other words, regardless of what data is included in the XML document, the responsibility of the signatory is limited to only the range represented by the signed summary text. As for the responsibilities of the agent, the guarantee service can be provided at various levels depending of the policies of the agent.

For example, in some embodiments there is a "non-guarantee policy". According to this policy, the agent is not responsible at all for contents other than the data included with the signature.

In addition, in some embodiments there is a "post-alternation prevention policy". According to this policy, contents other than those included with the signature are prevented from being altered later by a malicious third party. The agent signs the XML document and stores it, or may request that this operation be performed by an external authentication service. In some embodiments there is also a "pre-session recording policy". According to this policy, the agent guarantees that a series of sessions will be arranged for obtaining the signature. To do this, a series of interactions for selecting various options and designating conditions before the purchase must be performed through the agent. The agent signs the target document and stores it, while recording each of these pre-sessions. Even if a malicious user does attempt to interfere with the transaction, evidence as to what information was transmitted to the user terminal is maintained, so that the electronic commerce site is afforded some guarantee as to contents other than the signed portion. Meanwhile, since the user can also be guaranteed that he or she will have any questions clarified, the user can profess ignorance of anything that he or she does not recognize.

Furthermore, in some embodiments there is a "target document contents check policy". According to this policy, the agent employs the profile of the user to determine whether contents other than the signed portion includes articles disadvantageous to the user. The contents of the checking are based on a contract that the user and the agent execute in advance. If the user is unsure about the honesty of the agent, the user, uncertain for a dishonest agent, after the fact, can determine whether any illegal checks were made by using the post alteration prevention policy and the external authentication service.

Moreover, since these policies are employed together, the agent can provide a flexible service. The present invention has been explained by referring to the embodiment. However, the invention is not limited to the embodiment, and can be variously modified without departing from the scope of the invention. In this embodiment, the private key and the signature template are stored in the user terminal 4.

However, the private key and the signature template may be recorded on a detachable storage medium, such as a smart card, and may be read by loading the storage medium into the terminal 4. Further, a signature calculation program may also be recorded on the detachable storage medium, and the above signature process may be performed by loading this recording medium into the terminal 4.

The typical effects obtained by the invention are as follows. The XML digital signature can be performed by using an information processing terminal, such as a portable terminal, having limited calculation resources. Further, a more secure, safer digital signature method and system, or a terminal for digital signature, can be provided.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture comprising a computer usable medium having computer readable program code means embodied therein for causing a function described above. The computer readable program code means in the article of manufacture comprising computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A digital signature method comprising the steps of:
generating, by a third agent mediating an electronic transaction between a signature demandant and signatory, summary text from an electronic document to be signed which is received from the signature demandant, the summary text including essential information to be confirmed relating to the electronic transaction;
displaying said summary text on a display screen of a terminal of the signatory;
calculating, in the terminal, a digest value for said summary text using a function with which a value uniquely representing input data is generated and regeneration of said input data from said value is difficult;
encrypting, in the terminal, data, including said digest value, using a private key stored in said terminal, end generating a signature value; and
generating, by the agent, a signed document including said signature value.

2. The digital signature method according to claim 1, wherein said electronic document and said signed document are XML documents, and said summary text is generated using XPath of said electronic document, which is an XML document.

3. The digital signature method according to claim 1, wherein said terminal includes a signature template having a variable field, further comprising the steps of:
adding said digest value to said variable field of said signature template;
employing said function to convert said signature template to which said digest value has been added, and
employing said private key to encrypt a value obtained by conversion and generating said signature value.

4. The digital signature method according to claim 3, wherein a URI for said electronic document is added to said variable field of said signature template.

5. The digital signature method according to claim 3, wherein said signature template is canonicalized using a predetermined algorithm.

6. The digital signature method according to claim 1, wherein said function is a hash function.

7. A digital signature system comprising:
a third party agent operative to mediate an electronic transaction between a signature demandant and a signatory, the agent being adapted to generate summary text from an electronic document to be signed, the document relating to the electronic transaction, the summary text including essential information to be confirmed relating to the electronic transaction;
a terminal of the signatory, the terminal including a display screen and means for displaying said summary on the display screen, the terminal being operative: (i) to calculate a digest value for said summary text using a function with which a value uniquely representing input data is generated and regeneration of said input data from said value is difficult; and (ii) to encrypt data, including said digest value, using a private key stored in said terminal; and
means for generating, by the agent, a signed document including a signature value corresponding to the encrypted data generated by the terminal.

8. The digital signature system according to claim 7, wherein said electronic document and said signed document are XML documents, further comprising:
means for generating said summary text using XPath of said electronic document, which is an XML document.

9. The digital signature system, according to claim 7, wherein said terminal includes a signature template having a variable field, further comprising:
means for adding said digest value to said variable field of said signature template;
means for employing said function to convert said signature template to which said digest value has been added; and
means for employing said private key to encrypt a value obtained by conversion.

10. The digital signature system according to claim 9, wherein a URI for said electronic document is added to said variable field of said signature template.

11. The digital signature system according to claim 9, wherein said signature template is canonicalized using a predetermined algorithm.

12. The digital signature system according to claim 7, wherein said function is a bash function.

13. A digital signature method comprising the steps of:
a signature demandant transmitting an electronic document to a third party agent mediating an electronic transaction between the signature demandant and a signatory;
said agent generating summary text from said electronic document, and transmitting said summary text to a terminal of the signatory, the summary text including essential information to be confirmed relating to the electronic transaction;
said signatory displaying said summary text on a display screen of said terminal of said signatory;
said signatory confirming said summary text, and employing a private key stored in said terminal to digitally sign at least one of said summary text and a document corresponding to said summary text;
said signatory transmitting, to said agent, a signature value generated by the digital signature;
said agent generating a signed document by adding said signature value to said electronic document; and
said agent transmitting said signed document to said signature demandant.

14. A digital signature system comprising:
means for permitting a signature demandant to transmit an electronic document to a third party agent mediating an electronic transaction between the signature demandant and a signatory;
means for permitting said agent to generate summary text from said electronic document, and to transmit said summary text to a terminal of the signatory, the summary text including essential information to be confirmed relating to the electronic transaction;
means for permitting said signatory to display said summary text on a display screen of said terminal of said signatory;
means for permitting said signatory to confirm said summary text, and to employ a private key stored in said terminal to digitally sign at least one of said summary text and a document corresponding to said summary text;
means for permitting said signatory to transmit, to said agent, a signature value generated by the digital signature;

means far permitting said agent to generate a signed document by adding said signature value to said electronic document; and means for permitting said agent to transmit said signed document to said signature demandant.

15. A digital signature mediation method comprising the steps of:

receiving an electronic document from a signature demandant;

a third party agent receiving the electronic document and generating summary text from said electronic document, the agent mediating an electronic transaction between the signature demandant and the signatory, die summary text including essential information to be confirmed relating to the electronic transaction;

the agent transmitting said summary text to a terminal of a signatory;

the agent generating a signed document by adding, to said electronic document, a signature value received from said terminal of said signatory; and transmitting said signed document to said signature demandant.

16. The digital signature mediation method according to claim 15, wherein said electronic document and said signed document are XML documents, and said summary text is generated using XPath of said electronic document, which is an XML document.

17. A digital signature mediation system comprising:

means for receiving an electronic document from a signature demandant;

means for generating, by a third party agent mediating an electronic transaction between the signature demandant and a signatory, summary text from said electronic document;

means for transmitting, by the agent, said summary text to a terminal of the signatory;

means for generating, by the agent, a signed document by adding, to said electronic document, a signature value received from said terminal of said signatory; and means for transmitting said signed document from the agent to said signature demandant.

18. The digital signature mediation system according to claim 17, wherein said electronic document and said signed document are XML documents, further comprising:

means for generating said summary text using XPath of said electronic document, which is an XML document.

19. An information terminal of a signatory, the information terminal comprising:

means for receiving summary text generated by a third party agent mediating an electronic transaction between a signature demandant and the signatory from an electronic document to be signed relating to the electronic transaction;

means for displaying said summary text on a display screen of the terminal;

means for calculating a digest value far said summary text using a function with which a value uniquely representing input data is generated and regeneration of said input data from said value is difficult;

storage means for storing a private key;

means for employing said private key to encrypt data, including said digest value; and means for generating a signature value obtained by the cryptography.

20. The information terminal according to claim 19, further comprising:

storage means for storing a signature template having a variable field;

means for adding, to said variable field of said signature template, said digest value, a URI of said electronic document and other information concerning said electronic document;

means for employing said function to convert said signature template to which said digest value and said information have been added; and means for employing said private key to encrypt a value obtained by conversion, and generating said signature value.

21. The information terminal according to claim 20, wherein said electronic document is an XML document, and said signature template is canonicalized using a predetermined algorithm.

22. A digital signature method comprising the steps of:

receiving summary text generated by a third party agent mediating an electronic transaction between a signature demandant and a signatory from an electronic document to be signed relating to the electronic transaction;

displaying said summary text on a display screen of a terminal of the signatory;

calculating, in the terminal, a digest value for said summary text using a function with which a value uniquely representing input data is generated and regeneration of said input data from said value is difficult;

encrypting, in the terminal, data, including said digest value by employing said private key that is recorded in a storage area of an information terminal, or in a storage area of a memory connectable to said information terminal; and generating a signature value obtained by the cryptography.

23. The digital signature method according to claim 22, further comprising:

adding said digest value, a URI of said electronic document and other information concerning said electronic document to a variable field of a signature template, which that is recorded in said storage area of said information terminal or in a storage area of a memory connectable to said information terminal;

employing said function to convert said signature template to which said digest value and said information have been added; and employing said private key to encrypt a value obtained by conversion, and generating said signature value.

24. The digital signature method according to claim 23, wherein said electronic document is an XML document, and said signature template is canonicalized using a predetermined algorithm.

25. An article of manufacture comprising a computer usable medium having computer readable program code means embodied therein for causing a digital signature, the computer readable program code means in said article of manufacture comprising computer readable program code means for causing a computer to effect the steps of claim 1.

26. An article of manufacture comprising a computer usable medium having computer readable program code means embodied therein for causing a digital signature, the computer readable program code means in said article of manufacture comprising computer readable program code means for causing a computer to effect the steps of claim 13.

27. An article of manufacture comprising a computer usable medium having computer readable program code means embodied therein for causing digital signature mediation, the computer readable program code means in said article of manufacture comprising computer readable program code means for causing a computer to effect the steps of claim 15.

28. A program storage device readable by machine, tangibly embodying a program of instructions executable by the machine to perform method steps for a digital signature, said method steps comprising the steps of claim 1.

29. A program storage device readable by machine, tangibly embodying a program of instructions executable by the machine to perform method steps for a digital signature, said method steps comprising the steps of claim 13.

30. A program storage device readable by machine, tangibly embodying a program of instructions executable by the machine to perform method steps for a digital signature, said method steps comprising the steps of claim 15.

31. A computer program product comprising a computer usable medium having computer readable program code means embodied therein for causing a digital signature system, the computer readable program code means in said computer program product comprising computer readable program code means for causing a computer to effect the functions of claim 7.

32. A computer program product comprising a computer usable medium having computer readable program code means embodied therein for causing a digital signature system, the computer readable program code means in said computer program product comprising computer readable program code means for causing a computer to effect the functions of claim 14.

33. A computer program product comprising a computer usable medium having computer readable program code means embodied therein for causing a digital signature mediation system, the computer readable program code means in said computer program product comprising computer readable program code means for causing a computer to effect the functions of claim 17.

34. A computer program product comprising a computer usable medium having computer readable program code means embodied therein for causing an information terminal, the computer readable program code means in said computer program product comprising computer readable program code means for causing a computer to effect the functions of claim 19.

35. An article of manufacture comprising a computer usable medium having computer readable program code means embodied therein for causing a digital signature, the computer readable program code means in said article of manufacture comprising computer readable program code means for causing a computer to effect the steps of claim 22.

36. A program storage device readable by machine, tangibly embodying a program of instructions executable by the machine to perform method steps for a digital signature, said method steps comprising the steps of claim 22.

* * * * *

UNITED STATES PATENT AND TRADEMARK OFFICE
CERTIFICATE OF CORRECTION

PATENT NO. : 6,990,585 B2
DATED : January 24, 2006
INVENTOR(S) : H. Maruyama et al.

It is certified that error appears in the above-identified patent and that said Letters Patent is hereby corrected as shown below:

<u>Column 12,</u>
Line 67, delete ":" and insert -- ; --.

<u>Column 13,</u>
Line 1, delete "far" and insert -- for --.
Line 14, delete "die" and insert -- the --.

Signed and Sealed this

Eleventh Day of April, 2006

JON W. DUDAS
*Director of the United States Patent and Trademark Office*